(12) United States Patent
Raza et al.

(10) Patent No.: US 11,522,828 B2
(45) Date of Patent: Dec. 6, 2022

(54) VIRTUALIZED NETWORK FUNCTIONS THROUGH ADDRESS SPACE AGGREGATION

(71) Applicant: Cisco Technology, Inc., San Jose, CA (US)

(72) Inventors: Syed Khalid Raza, Fremont, CA (US); Murtuza Attarwala, Davis, CA (US)

(73) Assignee: Cisco Technology, Inc., San Jose, CA (US)

( * ) Notice: Subject to any disclaimer, the term of this patent is extended or adjusted under 35 U.S.C. 154(b) by 511 days.

(21) Appl. No.: 15/664,869

(22) Filed: Jul. 31, 2017

(65) Prior Publication Data

US 2019/0036876 A1 Jan. 31, 2019

(51) Int. Cl.
*H04L 61/2592* (2022.01)
*H04L 45/74* (2022.01)
*H04L 61/2514* (2022.01)

(52) U.S. Cl.
CPC ......... *H04L 61/2592* (2013.01); *H04L 45/74* (2013.01); *H04L 61/2514* (2013.01)

(58) Field of Classification Search
CPC ....... H04L 61/00; H04L 61/25; H04L 61/256; H04L 61/2592; H04L 45/74; H04L 45/745
See application file for complete search history.

(56) References Cited

U.S. PATENT DOCUMENTS

| | | | |
|---|---|---|---|
| 2006/0013209 A1* | 1/2006 | Somasundaram .. | H04L 12/4675 370/389 |
| 2007/0064661 A1 | 3/2007 | Sood et al. | |
| 2012/0151057 A1* | 6/2012 | Paredes ............... | H04L 12/4641 709/225 |
| 2014/0280884 A1* | 9/2014 | Searle ................. | H04L 43/0864 709/224 |

FOREIGN PATENT DOCUMENTS

| | | |
|---|---|---|
| CN | 102546407 A | 7/2012 |
| EP | 2635002 A1 | 9/2013 |

OTHER PUBLICATIONS

International Search Report and Written Opinion from the International Searching Authority, dated Oct. 24, 2018, 2018, 10 pages, for corresponding International Patent Application No. PCT/US2018/043618.

(Continued)

*Primary Examiner* — James R Sheleheda
(74) *Attorney, Agent, or Firm* — Polsinelli

(57) ABSTRACT

In some examples, an example method to provide a virtualized Carrier-grade Network Address Translation (CGN) at a first customer edge router may include establishing a tunnel between the first customer edge router and each aggregation router among one or more aggregation routers, performing a Network Address Translation (NAT) on a first data packet to create a NAT'ed first data packet, selecting a first aggregation router from amongst the one or more aggregation routers to send the NAT'ed first data packet to, encapsulating the NAT'ed first data packet with overlay (Continued)

information corresponding to a tunnel established between the first customer edge router and a first aggregation router, and sending the encapsulated NAT'ed first data packet through the tunnel to the first aggregation router.

19 Claims, 8 Drawing Sheets

(56) References Cited

OTHER PUBLICATIONS

Borella, M., et al., "Realm Specific IP: Protocol Specification," Oct. 2001, pp. 1-54.
Cui, Y., et al., "Lightweight 4over6: An Extension to the Dual-Stack Lite Architecture," Jul. 2015, pp. 1-22.
Durand, A., et al., "Dual-Stack Lite Broadband Deployments Following IPv4 Exhaustion," Aug. 2011, pp. 1-32.

* cited by examiner

VIRTUALIZED NETWORK FUNCTIONS THROUGH ADDRESS SPACE AGGREGATION

FIELD

The present disclosure relates generally to network communications.

BACKGROUND

Presently, there is a growing movement among enterprises and other entities towards cloud architectures. One consequence of this movement is that enterprise customers are demanding more managed services, such as connectivity and security services (e.g., secure connectivity and transmission of data, firewall services, and the like), from their network service providers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to provide a virtualized Carrier-grade Network Address Translation (CGN) at a customer edge router of multiple customer edge routers are described. An example method to provide a virtualized CGN at a first customer edge router of multiple customer edge routers may include establishing, by the first customer edge router, a tunnel between the first customer edge router and each aggregation router among one or more aggregation routers, and performing, by the first customer edge router, a Network Address Translation (NAT) on a first data packet to create a NAT'ed first data packet, the NAT being a translation of a private IP address to a public IP address. The method may also include selecting, by the first customer edge router, a first aggregation router from amongst the one or more aggregation routers to send the NAT'ed first data packet to, encapsulating, by the first customer edge router, the NAT'ed first data packet with overlay information corresponding to a tunnel established between the first customer edge router and the first aggregation router, and sending, by the first customer edge router, the encapsulated NAT'ed first data packet through the tunnel to the first aggregation router.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
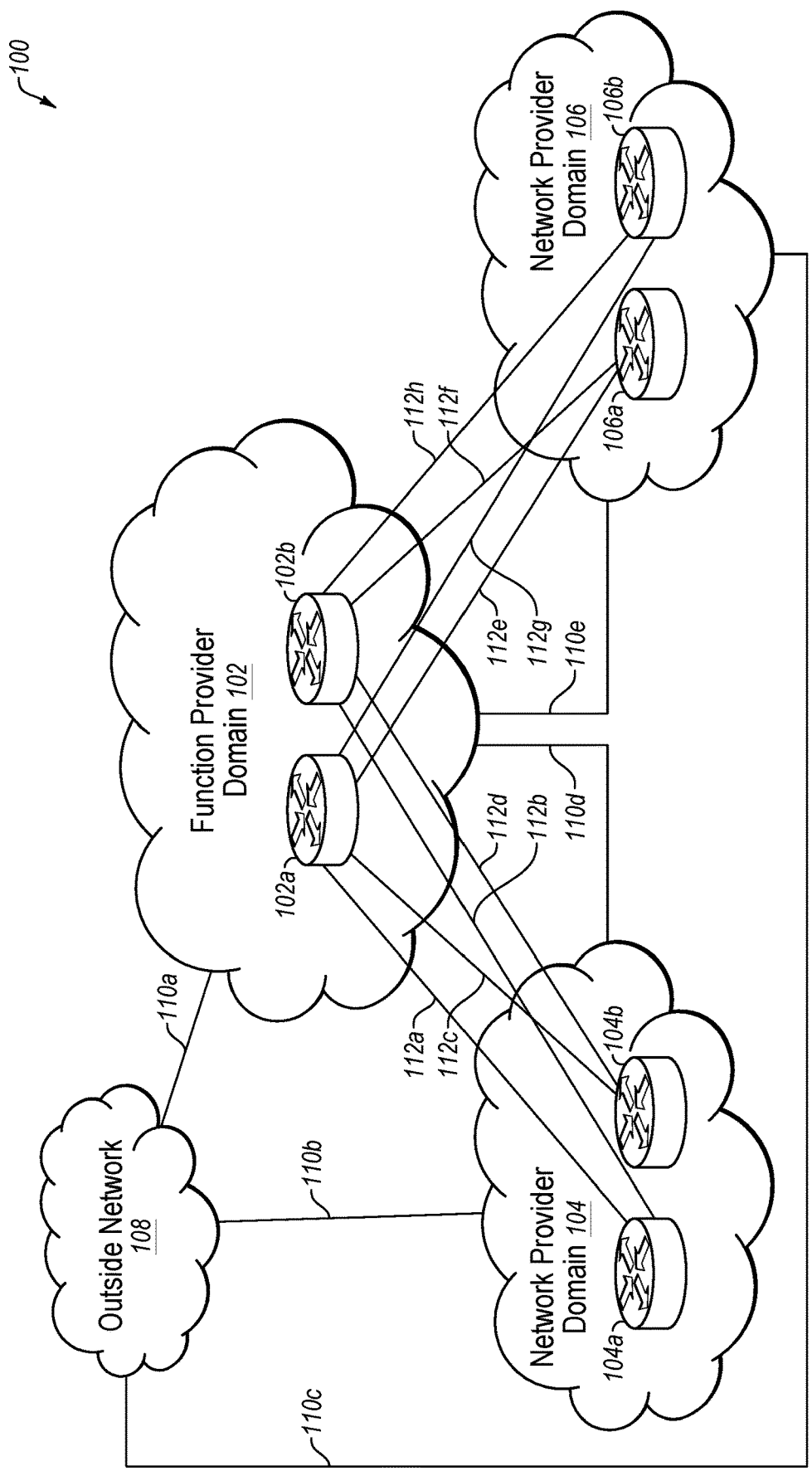
FIG. 1 illustrates an overview of an environment and devices on which an architecture of the present disclosure may operate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to allowing multiple, distributed network nodes to participate in and enable one or more managed services (interchangeably referred to herein as "network functions" or "functions") that would typically be delivered using a small number of centralized, large scale network appliances.

As discussed above, enterprises are demanding more managed services from their network service providers. In providing the managed services to an enterprise, a network service provider (interchangeably referred to herein as a "network carrier" or "carrier") may employ an aggregation layer that includes a small number of centralized network nodes or aggregation nodes. The network service provider may place an enterprise customer on one side of the aggregation layer, and the network infrastructure that is outside of the enterprise customer, such as the Internet, on the other side of the aggregation layer. The network service provider may direct all network traffic between the enterprise customer and the network infrastructure outside the enterprise customer through the aggregation layer. That is, all network traffic into and out of the carrier network travels through the small number of centralized aggregation nodes in the aggregation layer.

For example, a carrier may employ a small number of centralized peering routers or provider edge routers (interchangeably referred to herein as "aggregation nodes" or "aggregation routers") in the aggregation layer, and place the small number of centralized aggregation routers at or near the public edge of the carrier network. The carrier may also employ and manage multiple routers (e.g., customer edge routers) at the edge of the carrier network where the enterprise customer connects to the carrier network. For example, the customer edge routers may be located at the various locations or premises of the enterprise customer. The customer edge routers may connect to the provider edge of the carrier, for example, the aggregation routers, and may be the last points of the carrier. The carrier may advertise a public address using the aggregation routers, thus directing the network traffic to the carrier network through the aggregation routers. The carrier may provide the appropriate routing between the aggregation routers and the customer edge routers. As all network traffic into and out of the carrier network passes through the small number of centralized aggregation routers, the carrier may provide the managed services at the small number of centralized aggregation routers. The carrier is also able to control the route of the return network traffic (e.g., get more network traffic to pass through the carrier network).

However, using a small number of centralized aggregation routers presents scalability issues in that the small number of nodes have to maintain a very large, and maybe significant amount of information. For example, the carrier may provide Carrier-grade Network Address Translation (CGN) at the aggregation routers to direct and control the network traffic into and out of the carrier network through the aggregation routers. CGN is an approach where the carrier is able to provide the customer edge routers (e.g., the enterprise customer) private addresses, bring the network traffic from the customer edge routers to the small number of aggregation routers, and translate the private network address to public addresses of the aggregation routers (e.g., the public address advertised by the aggregation routers) at the aggregation routers. The aggregation routers may perform a "reverse" translation for the return network traffic to the customer edge routers. This may require the small number of aggregation routers to maintain a very large, and maybe significant amount of state information as the aggregation routers may be providing CGN for a very large number of network addresses (e.g., network nodes). This may present scalability issues. In addition, a failure of an aggregation router may have a significant impact (e.g., affect a very large number of network nodes) as the aggregation router may be serving hundreds or thousands of customers.

The present disclosure generally describes any number of distributed network nodes participating in and enabling one or more network functions that would typically be delivered using a small number of centralized aggregation nodes. In some embodiments, multiple customer edge routers may use a combination of distributed processing and address space aggregation across a carrier network domain where a network function is to be provided to deliver the network function in a virtualized manner.

For the purpose of providing an example, CGN function will be described as an example of a virtualized network function. Those of ordinary skill in the art will appreciate that other network functions, such as firewalls, content inspection and filtering, customer premises equipment (CPE), and the like, may be similarly provided in a virtualized manner as described herein with respect to CGN. Another example of such a network function may include virtual private networking (VPN) and associated address mapping when transporting packets from and/or to one or more VPNs.

In some embodiments, a virtualized CGN function may be provided on an architecture that includes an aggregation platform layer, a function endpoint layer, and an aggregated or functional Internet Protocol (IP) address space. The aggregation platform layer may include one or more aggregation routers. The aggregation platform layer may terminate the tunnels from the function endpoint layer to act as a gateway between an outside network (e.g., the Internet) and the devices performing the virtualized CGN function. The aggregation platform layer may also advertise an aggregated IP address space. The advertised aggregated IP address space may provide return routability to the function endpoint layer such that the function endpoint layer appears to be on a carrier network that is providing the virtualized CGN function.

The function endpoint layer may include the devices that perform the Network Address Translation (NAT) to collectively form a virtualized CGN carrier network (e.g., virtualized CGN domain). The virtualized CGN carrier network may be accessible through the aggregation platform layer. The function endpoint layer may include one or more customer edge routers. Each customer edge router may establish a tunnel to each aggregation router in the aggregation platform layer to establish an overlay network.

The aggregated IP address space may be assigned to the customer edge routers in the function endpoint layer as individual IP addresses, for example, on the connections facing the carrier network. In instances where a customer edge router resides in multiple carrier networks, the aggregated IP address space may be assigned to the customer edge router as a logical loopback address. The aggregated IP address space may be assigned by the carrier, and advertised from the aggregation routers in the aggregation platform layer. In some embodiments, the aggregated IP address space may be carrier independent. One benefit of this architecture is that the customer edge routers in the function endpoint may reside in any carrier domain (e.g., carrier network), and be logically tied to the carrier that is providing (managing) the virtualized CGN function.

In some embodiments, each aggregation router may advertise an aggregated IP address space. The aggregated IP address space includes the IP addresses assigned to the customer edge routers. Each customer edge router performs the NAT using its assigned IP address. Each customer edge router may establish a tunnel with each aggregation router. Suitable protocols for establishing a tunnel include, by way of example, Generic Routing Encapsulation (GRE), Internet Protocol Security (IPsec), Layer 2 Tunneling Protocol (L2TP), and/or others.

Upon receiving a data packet (e.g., network traffic) that is subject to NAT (e.g., network traffic from the enterprise customer), the customer edge router may perform the NAT of the data packet using the IP address assigned to the customer edge router, encapsulate the NAT'ed data packet with overlay information of a tunnel to a specific aggregation router, and send the encapsulated data packet to the specific aggregation router through the tunnel. At the other end of the tunnel, the specific aggregation router may remove the overlay information, maintain a record of the tunnel through which the data packet is received, and forward the de-encapsulated data packet to the specified destination. For example, the specific aggregation router may maintain the record of the tunnel through which the data packet was received in a routing table.

In some embodiments, the customer edge router may perform VPN mapping. For example, when receiving a data packet from a VPN, when performing the NAT of the data packet the customer edge router may identify the VPN with which the data packet is associated. Additionally or alternatively, the customer edge router may maintain a Virtual Routing & Forwarding (VRF) table that identifies which addresses are to be routed within the particular VPN. For example, the customer edge router may store a route target for the route distinguishers to identify the VPN. The NAT performed on the data packet may address VPN routing such that the specific aggregation router does not store any VPN information. Embodiments of the present disclosure may provide an arrangement such that an enterprise may acquire a data link to a provider (e.g., Verizon or Comcast) and may obtain VPN services via the customer edge routers rather than the provider edge router.

When an aggregation router receives a return data packet (e.g., return network traffic), the aggregation router may forward the return data packet to a specific (e.g., correct) customer edge router based on the addressing information in the return data packet. For example, the destination address specified in the return data packet may be that of an address in the aggregated IP address space. As this is a return data packet, the source and destination addresses in the return data packet may be the "reverse" of the source and destination addresses in the original, NAT'ed data packet. That is, the original, NAT'ed source address is now the destination address in the return data packet, and the original destination address is now the source address in the return data packet. The aggregation router may identify a specific customer edge router, and the tunnel established with the specific customer edge router, based on the previously maintained record of the tunnels through which it received the NAT'ed data packets. The aggregation router may encapsulate the return data packet with overlay information of the tunnel to the identified customer edge router, and send the encapsulated return data packet to the identified customer edge router through the tunnel. At the other end of the tunnel, the specific customer edge router may remove the overlay information, perform a reverse translation (e.g., reverse NAT) of the return data packet, and forward the de-encapsulated, reverse translated return data packet to the specified destination.

In some embodiments, when the customer edge router receives the return data packet to perform the reverse NAT, the customer edge router may additionally perform VPN mapping. For example, the NAT table may identify to which VPN the return data packet is directed to. The VRF table of that VPN may identify where the return data packet is to be routed within the VPN.

As described above, in some embodiments, the architecture provides for construction of a virtual CGN function by allowing each customer edge router to perform the NAT of the network traffic, using the aggregation routers as entry and exit points to the NAT function, and routing the network traffic in an overlay network using tunnels between each customer edge router and the aggregation routers. One benefit provided by the architecture is that any scaling issue is greatly minimized. For example, as the scale of the virtual CGN may be limited by the amount of network traffic and/or the number of tunnels that may be supported by any one aggregation router, this scale issue may be readily addressed by clustering customer edge routers around additional aggregation routers.

Moreover, as each customer edge router is performing the NAT function, each customer edge router maintains the state information for the network traffic NAT performed by the customer edge router. The aggregation routers do not maintain any NAT state information. As there may be many customer edge routers performing the NAT function and each customer edge router is serving a single customer, failure of an aggregation router or any customer edge router at most affects the state information maintained by the failing router. Accordingly, one benefit is that the architecture described herein is very resilient in that a failure will likely have a small impact (e.g., affect a small number of network nodes).

Embodiments of the present disclosure are explained with reference to the accompanying drawings.

FIG. 1 illustrates an overview of an environment 100 and devices on which an architecture of the present disclosure may operate, arranged in accordance with at least some embodiments described herein. Environment 100 may include a function provider domain 102, network provider domains 104 and 106, and an outside network 108. Function provider domain 102, network provider domain 104, and network provider domain 106 may be a carrier network provided and managed by a carrier such as Verizon, AT&T, Sprint, Comcast, and the like. Outside network 108 may include any network infrastructure, such as the Internet, one or more connected public networks, and the like, that is external to an enterprise customer. Function provider domain 102, network provider domains 104 and 106, and outside network 108 may each be logically connected to the other by communication links 110a-110e. Communication links 110a-110e may be interprovider (e.g., intercarrier) links.

Function provider domain 102 may provide the aggregation platform layer functionality. Function provider domain 102 may include a small number of network appliances, such as aggregation routers 102a and 102b. Aggregation routers 102a and 102b may be located or placed at or near the public edge of the carrier network (e.g., function provider domain 102). Function provider domain 102 may operate or function as a gateway between network provider domains 104 and 106 and outside network 108.

Network provider domains 104 and 106 may provide the Network Address Translation (NAT) functionality. Network provider domains 104 and 106 may each include multiple network appliances, such as customer edge routers, located or placed at the edge of the carrier network (e.g., network provider domain 104 and network provider domain 106, respectively) where an enterprise customer connects to the carrier network. As depicted, network provider domain 104 may include customer edge routers 104a and 104b located or placed at the enterprise customer edge of the carrier network (e.g., network provider domain 104). Network provider domain 106 may include customer edge routers 106a and 106b located or placed at the enterprise customer edge of the carrier network (e.g., network provider domain 106).

In some embodiments, the network provider domain 104 may establish an overlay network with the function provider domain 102. For example, each customer edge router 104a, 104b, 106a, and 106b may be configured to establish a tunnel to each aggregation router 102a and 102b in the function provider domain. The established tunnels tie or connect the NAT execution locations (e.g., the function execution customer edge routers 104a, 104b, 106a, and 106b) with the aggregation points (e.g., aggregation routers 102a and 102b) to provide a logical reference and connection in an overlay fashion. As illustrated, a tunnel 112a may be established between customer edge router 104a and aggregation router 102a, a tunnel 112b may be established between customer edge router 104a and aggregation router 102b, a tunnel 112c may be established between customer edge router 104b and aggregation router 102a, a tunnel 112d may be established between customer edge router 104d and aggregation router 102b, a tunnel 112e may be established between customer edge router 106a and aggregation router 102a, a tunnel 112f may be established between customer edge router 106a and aggregation router 102b, a tunnel 112g may be established between customer edge router 106b and aggregation router 102a, and a tunnel 112h may be established between customer edge router 106d and aggregation router 102b. In some embodiments, an abstraction mechanism other than tunnels, may be used to provide the logical reference and connection between the network provider domain 104 and the function provider domain 102.

In some embodiments, function provider domain 102 and network provider domains 104 and 106 may be provided by a single or same carrier. That is, function provider domain 102 and network provider domains 104 and 106 may be a carrier network provided and managed by a single carrier. For example, an enterprise having two locations (a first location and a second location) may have contracted with a carrier such as Verizon to manage its network (e.g., provide managed services including CGN to the enterprise customer). Verizon may be able to support both enterprise customer locations with its networks (e.g., network provider domain 104 to service the first enterprise customer location and network provider domain 106 to service the second enterprise customer location). That is, Verizon may have sufficient network circuits to support both enterprise customer locations. As a result, function provider domain 102 and network provider domains 104 and 106 may be a Verizon network. Verizon may place customer edge routers 104a and 104b at the first enterprise customer location, and customer edge routers 106a and 106b at the second enterprise customer location. Verizon may manage each customer edge routers 104a, 104b, 106a, and 106b to perform the NAT functionality to provide the virtual CGN. That is, customer edge routers 104a, 104b, 106a, and 106b may be configured to collectively form a virtualized CGN carrier network.

In some embodiments, one or more network provider domains (e.g., network provider domain 104 and/or network provider domain 106) may be provided by a carrier that is different than the carrier providing function provider domain 102. That is, function provider domain 102 may be a first carrier network provided and managed by a first carrier, and one or more network provider domains (e.g., network provider domain 104 and/or network provider domain 106) may be a second carrier network provided and managed by a second carrier. Continuing the Verizon example above, Verizon may be able to support the first enterprise customer location but not the second enterprise customer location. That is, Verizon may have the infrastructure (e.g., network circuits) to support the first enterprise customer location, but lack (e.g., not have) the infrastructure to support the second enterprise customer location. In this instance, Verizon may lease the necessary network circuits from a carrier that has the infrastructure to support the second enterprise customer location. For example, assuming that Comcast has the infrastructure to support the second enterprise customer location, Verizon may lease the necessary network circuits from Comcast to support the second enterprise customer location. As a result, function provider domain 102 and network provider domain 104 may be a Verizon network to service the first customer location, and network provider domain 106 may be a Comcast network to service the second enterprise customer location. Verizon is only leasing the Comcast network circuits to support the second enterprise customer location. Verizon is managing the enterprise customer networks at both the first enterprise customer location and the second enterprise customer location. Accordingly, Verizon may place customer edge routers 104a and 104b at the first enterprise customer location, and customer edge routers 106a and 106b at the second enterprise customer location. Although customer edge routers 106a and 106b are Verizon routers managed by Verizon, customer edge routers 106a and 106b are connected to Comcast network circuits. Verizon may manage each customer edge routers 104a, 104b, 106a, and 106b to perform the NAT functionality to provide the virtual CGN. That is, customer edge routers 104a, 104b, 106a, and 106b may be configured to collectively form a virtualized CGN carrier network.

Modifications, additions, or omissions may be made to FIG. 1 without departing from the scope of the present disclosure. For example, while illustrated as including two provider edge routers, function provider domain 102 may include a different number of aggregation routers. As another example, while illustrated as including two customer edge routers, each or both of network provider domains 104 and/or 106 may include any number of customer edge routers, such as hundreds of customer edge routers. As still another example, there may be a different number of network provider domains, such as tens or possibly hundreds, based on the number of enterprise customer locations. Moreover, multiple carriers in addition to the carrier providing the carrier network for the function provider domain may be providing the carrier networks for some of the network provider domains.

Figure 2:
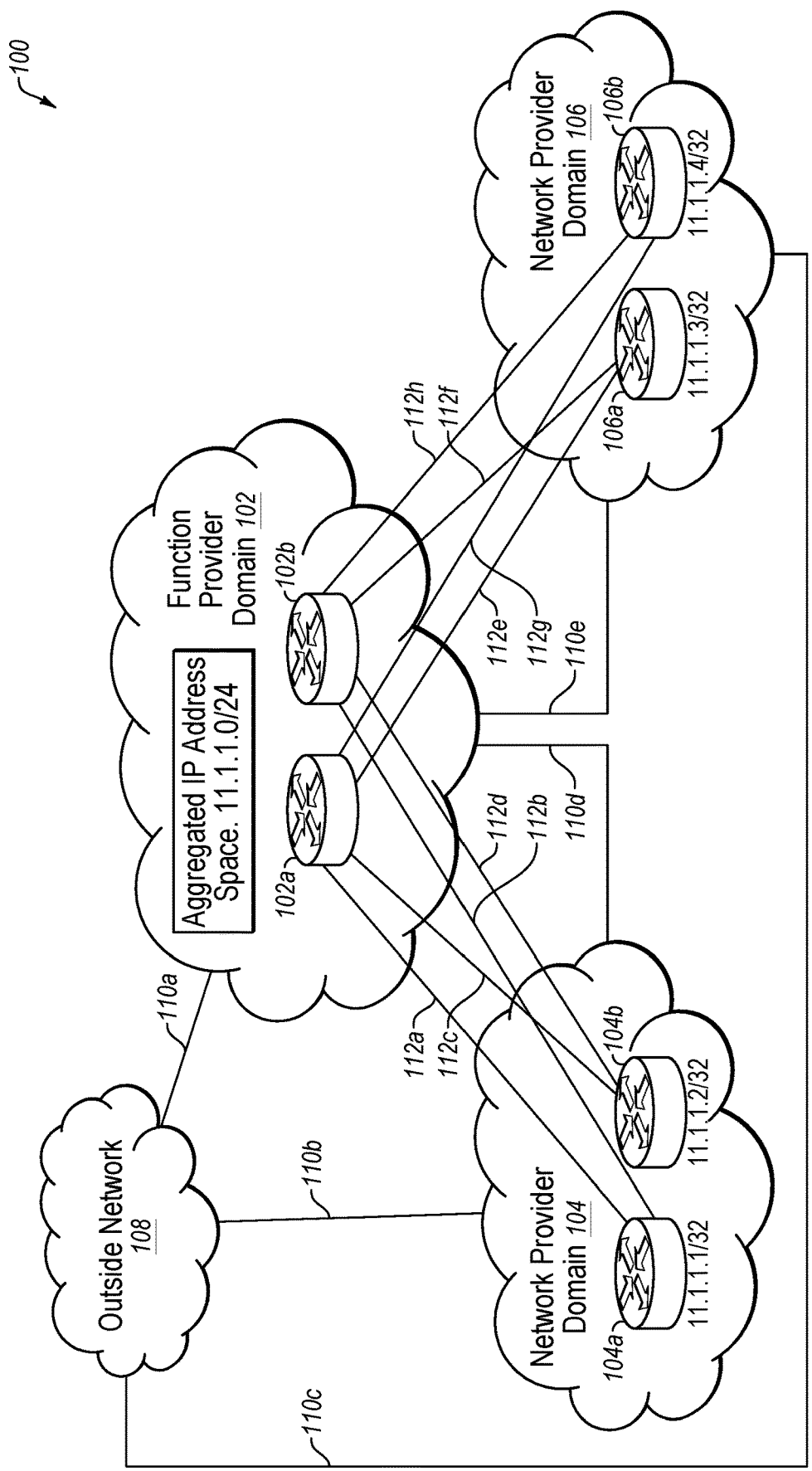
FIG. 2 illustrates an example address space management in the architecture of FIG. 1.

FIG. 2 illustrates an example address space management in the architecture of FIG. 1, arranged in accordance with at least some embodiments described herein. The architecture of FIG. 2 is substantially similar to the architecture of FIG. 1, with additional details. Those components in FIG. 2 that are labelled identically to components of FIG. 1 will not be described again for the purposes of clarity. More specifically, FIG. 2 illustrates an example assignment of an aggregated IP address space of the aggregation platform layer to the function endpoint layer as individual public IP addresses. The individual public IP addresses are specific IP addresses in the aggregated IP address space. In some embodiments, a carrier that is providing function provider domain 102 may assign an aggregated IP address space to the aggregation routers (e.g., aggregation routers 102a and 102b) in function provider domain 102. The aggregated IP address space may be a block of public IP addresses belonging to the carrier. The carrier may assign a specific host IP address from the aggregated IP address space to each customer edge router (e.g., customer edge routers 104a, 104b, 106a, and 106b) the carrier is managing through function provider domain 102. Each customer edge router in the function endpoint layer may be configured to perform NAT using the assigned host IP address.

Referring again the Verizon example above, and as illustrated in FIG. 2, aggregated IP address space 11.1.1.0/24 may be a block of public IP addresses belonging to Verizon. Verizon may assign the block of public IP addresses to aggregation routers 102a and 102b. Verizon may distribute the block of public IP addresses, 11.1.1.0/24, to the enterprise customer Verizon is providing managed services to. As illustrated, Verizon may assign public IP address 11.1.1.1/32 to customer edge router 104a, public IP address 11.1.1.2/32 to customer edge router 104b, public IP address 11.1.1.3/32 to customer edge router 106a, and public IP address 11.1.1.4/32 to customer edge router 106b. Even in the example above where Comcast is providing network provider domain 106, Verizon may assign specific public IP addresses from the aggregated IP address space to customer edge routers 106a and 106b since these routers are being managed by Verizon.

Figure 3:
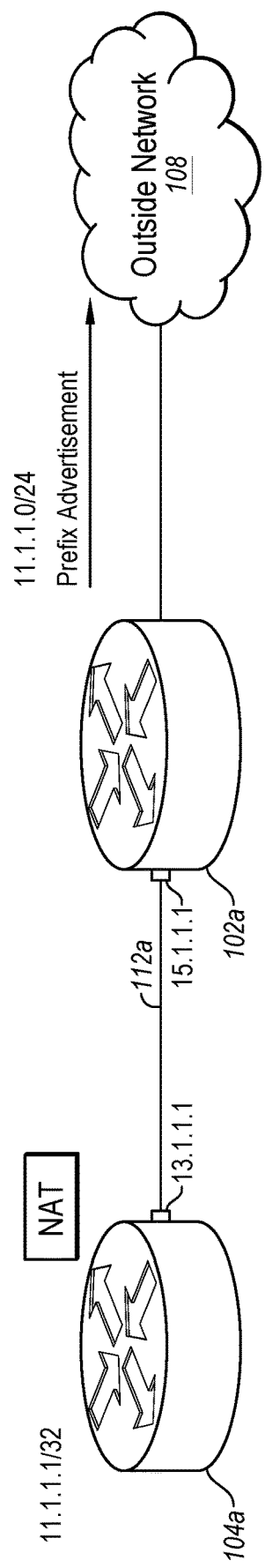
FIG. 3 illustrates an example address and function assignments of selected devices in the architecture of FIG. 1.

FIG. 3 illustrates an example address and function assignments of selected devices in the architecture of FIG. 1, arranged in accordance with at least some embodiments described herein. Customer edge router 104a may establish tunnel 112a to aggregation router 102a. For example, tunnel 112a may be logically connected to port address 13.1.1.1 at customer edge router 104a, and port address 15.1.1.1 at aggregation router 102a. Tunnel 112a provides an overlay. Provider edge router 102a may be configured to advertise the aggregated IP address space assigned to function provider domain 102 to the public. For example, provider edge router 102 may advertise the IP address prefix 11.1.1.0/24 to outside network 108. Customer edge router 104a may be configured to perform NAT of data packets using the specific host IP address assigned to customer edge router 104. The specific host IP address is a public IP address included in the aggregated IP address space. For example, customer edge router 104a may perform NAT using host IP address 11.1.1.1/32. Performing NAT using its host address and using the overlay to aggregation router 102a allows customer edge router 104a to retain visibility of return network traffic even in instances where the circuit is being provided by a different carrier. That is, the return network traffic is able to come back to customer edge router 104a.

Figure 4:
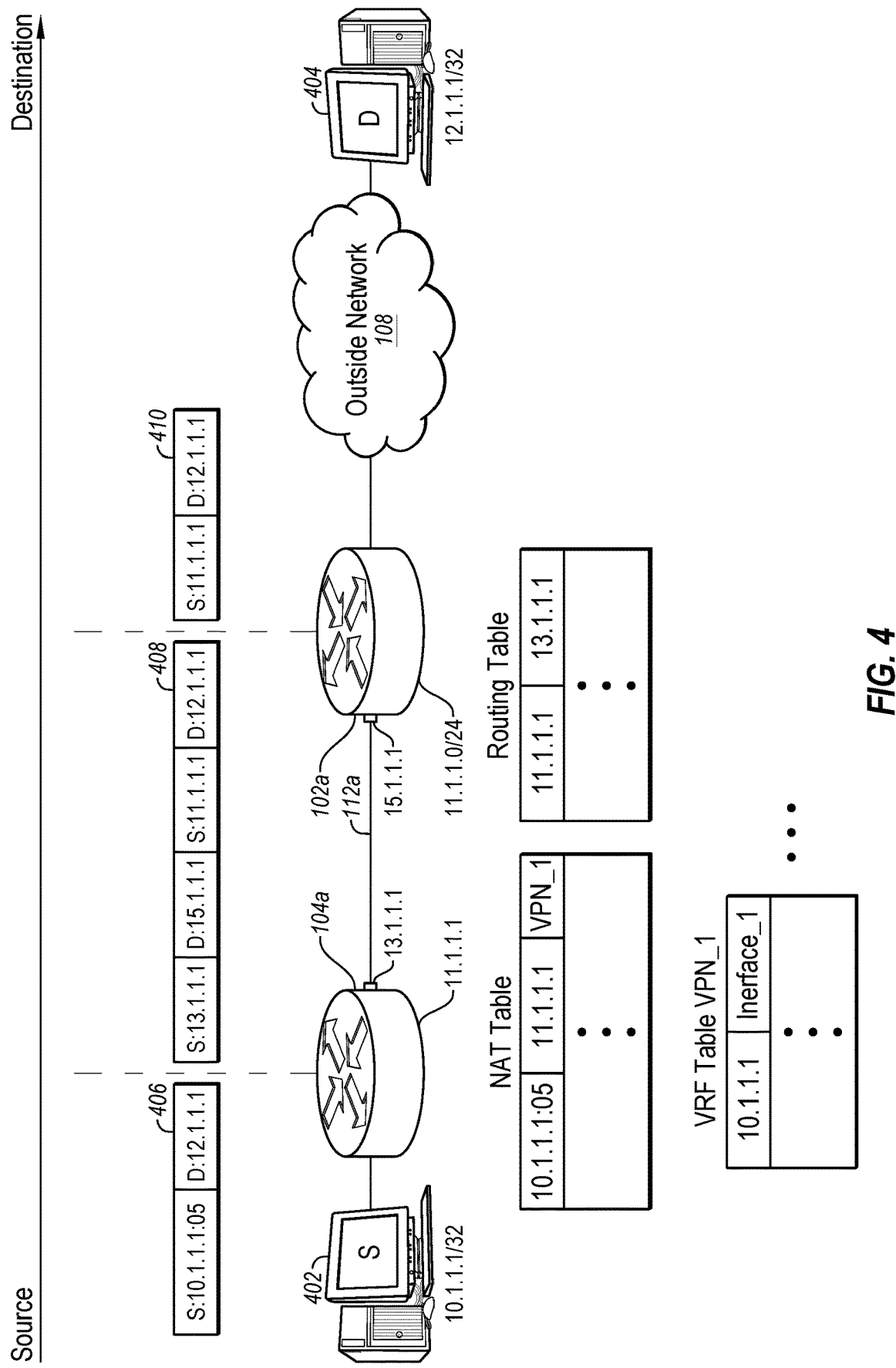
FIG. 4 is a sequence diagram that illustrates an example network traffic flow.

FIG. 4 is a sequence diagram that illustrates an example network traffic flow, arranged in accordance with at least some embodiments described herein. As depicted, the network traffic flow may be from a source, for example, a client device 402, to a destination, for example, a client device 404. Client device 402 may have a private IP address 10.1.1.1, and client device 404 may have a private IP address 12.1.1.1. Client device 402 may send or transmit a data packet 406, which specifies a source IP address 10.1.1.1:05 and a destination IP address 12.1.1.1 (e.g., from port: 05). Data packet 406 may also include other information.

Customer edge router 104a may receive data packet 406 and determine to perform NAT on data packet 406. For example, customer edge router 104a may make a determination to perform NAT based on local configuration and/or one or more applicable policies. Having determined to perform NAT on data packet 406, customer edge router 104a may translate the private source IP address 10.1.1.1:05 to public IP address 11.1.1.1, which is the device IP address assigned to customer edge router 104a. The NAT'ed data packet may specify a new source IP address 11.1.1.1 and the destination IP address 12.1.1.1. Customer edge router may maintain a record of the mapping of private IP address 10.1.1.1:05 to public IP address 11.1.1.1, for example, in a NAT mapping table.

Additionally or alternatively, the customer edge router 104a may maintain a virtual routing and forwarding (VRF) table. For example, the enterprise associated with customer edge router 104a may operate multiple VPNs, each with their own VRF. Based on which VPN the data packet is received from, the customer edge router 104a may create an entry in the NAT table identifying to which VPN the data packet belongs. As illustrated in FIG. 4, the data packet 406 may come from VPN_1. The customer edge router 104a may additionally create an entry in the VRF table for VPN_1 that identifies that data packets directed to the address 10.1.1.1 are to be out of Interface_1 of the customer edge router 104a.

In some embodiments, a range of addresses may be assigned to a given customer such that one or more VPNs of the customer may be given a specific IP address within the range of addresses. In these and other embodiments, the range of addresses may cover the number of VPNs an organization may utilize.

Customer edge router 104a may then determine that the NAT'ed data packet is to be sent to aggregation router 102a. For example, customer edge router 104a may select the appropriate aggregation router to receive the NAT'ed data packet based on local configuration and/or one or more applicable policies. Having selected aggregation router 102a, customer edge router 104a may encapsulate the NAT'ed data packet with overlay information that corresponds to (e.g., identifies) tunnel 112a. For example, the overlay information may include an overlay header that specifies a source port address of tunnel 112a, 13.1.1.1, and a destination port address of tunnel 112a, 15.1.1.1. An encapsulated and NAT'ed data packet 408 may specify a source IP address 11.1.1.1 and a destination IP address 12.1.1.1, and include an overlay header that specifies a source port address 13.1.1.1 and a destination port address 15.1.1.1. Customer edge router 104a may send encapsulated and NAT'ed data packet 408 through tunnel 112a to aggregation router 102a. Encapsulated and NAT'ed data packet 408 may also include other information.

Aggregation router 102a may receive encapsulated and NAT'ed data packet 408, for example, at the other end of tunnel 112a. Aggregation router 102a may remove the overlay header, source port address 13.1.1.1 and destination port address 15.1.1.1, from encapsulated and NAT'ed data packet 408 to generate a de-encapsulated data packet 410. De-encapsulated data packet 410 may specify the source IP address 11.1.1.1 and the destination IP address 12.1.1.1. From the overlay header, aggregation router 102a may identify tunnel 112a as the tunnel through which encapsulated and NAT'ed data packet 408 is received. Aggregation router 102a may maintain a record that encapsulated and NAT'ed data packet 408 is received through tunnel 112a, for example, in a routing table. For example, the record may indicate that IP address 11.1.1.1 (e.g., the source IP address specified in de-encapsulated data packet 410) is routed to IP address 13.1.1.1 (e.g., the source port address specified in the overlay header). Aggregation router 102a may use this record to correctly route the return network traffic to customer edge router 104a. Aggregation router 102a may send de-encapsulated data packet 410 on its way to client device 404. For example, de-encapsulated data packet 410 may be sent to its destination client device 404 through outside network 108.

Figure 5:
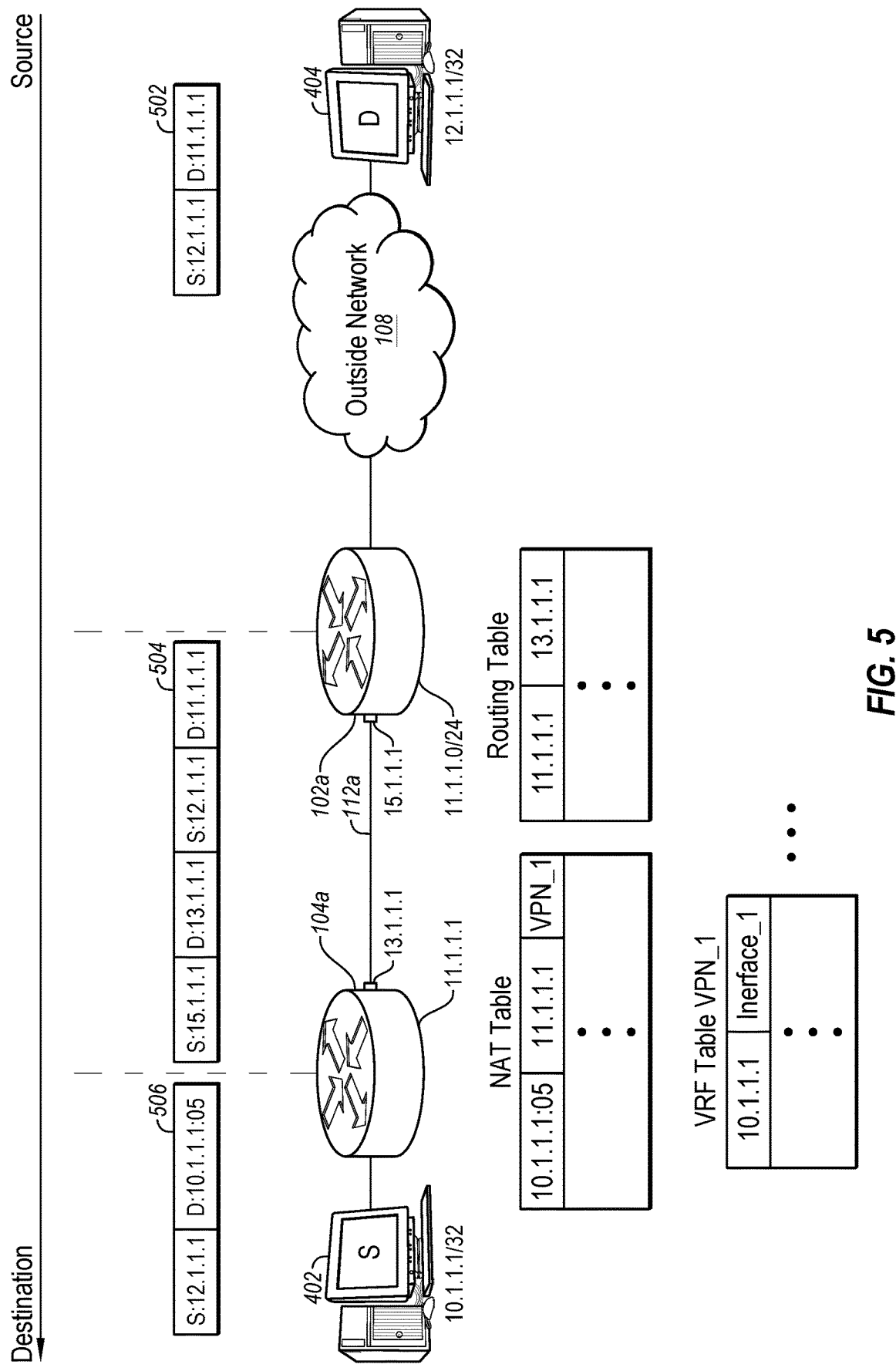
FIG. 5 is a sequence diagram that illustrates an example return network traffic flow.

FIG. 5 is a sequence diagram that illustrates an example return network traffic flow, arranged in accordance with at least some embodiments described herein. The return network traffic flow may be from a client device, for example, client device 404, to a client device, for example, client device 402. For example, the return network flow may be a response to previously transmitted data packet or data packets from client device 402 to client device 404. Client device 404 may have a private IP address 12.1.1.1, and client device 402 may have a private IP address 10.1.1.1. Client device 404 may send or transmit a data packet 502, which specifies a source IP address 12.1.1.1 and a destination IP address 11.1.1.1. Data packet 502 may also include other information.

Aggregation router 102a may receive data packet 502, for example, through outside network 108. Aggregation router 102a may determine that data packet 502 is to be forwarded to a network appliance, such as a customer edge router, in the corresponding function endpoint layer. Aggregation router 102a may make the determination based on the destination IP address specified in data packet 502. For example, aggregation router 102a may determine that the destination IP address 11.1.1.1 specified in data packet 502 is an individual public IP address in the aggregated IP address 11.1.1.0/24 assigned to aggregation router 102a. Aggregation router 102a may identify the appropriate tunnel to forward data packet 502 based on the destination IP address specified in data packet 502 and its routing table. For example, aggregation router 102a may determine from its routing table that IP address 11.1.1.1 (e.g., the destination IP address specified in data packet 502) is to be forwarded through a tunnel established with port address 13.1.1.1. Aggregation router 102a may encapsulate data packet 502 with overlay information that corresponds to (e.g., identifies) tunnel 112a (e.g., the tunnel to port address 13.1.1.1). For example, the overlay information may include an overlay header that specifies a source port address of tunnel 112a, 15.1.1.1, and a destination port address of tunnel 112a, 13.1.1.1. An encapsulated data packet 504 may specify a source IP address 12.1.1.1 and a destination IP address 11.1.1.1, and include an overlay header that specifies a source port address 15.1.1.1 and a destination port address 13.1.1.1. Aggregation router 102a may send encapsulated data packet 504 through tunnel 112a to customer edge router 104a. Encapsulated data packet 504 may also include other information.

Customer edge router 104a may receive encapsulated data packet 504, for example, at the other end of tunnel 112a. Customer edge router 104a may remove the overlay header, source port address 15.1.1.1 and destination port address 13.1.1.1, from encapsulated data packet 504 to de-encapsulate data packet 504. Customer edge router 104a may determine to perform a reverse NAT on the de-encapsulated data packet. For example, customer edge router 104a may make a determination to perform a reverse NAT based on the destination IP address specified in the de-encapsulated data packet. Customer edge router 104a may determine from its NAT table that private IP address 10.1.1.1:05 was translated to public IP address 11.1.1.1 (e.g., the destination IP address specified in the de-encapsulated data packet). Customer edge router 104a may reverse translate the public destination IP address 11.1.1.1 in the de-encapsulated data packet to private IP address 10.1.1.1:05 to generate a reverse NAT'ed data packet 506. Reverse NAT'ed data packet 506 may specify the source IP address 12.1.1.1 and a new destination IP address 10.1.1.1:05. Reverse NAT'ed data packet 506 may also include other information. Customer edge router 104a may send reverse NAT'ed data packet 506 on its way to the destination address specified in reverse NAT'ed data packet 506 (e.g., client device 402).

Additionally or alternatively, the customer edge router 104a may observe from the NAT table that the destination address 10.1.1.1:05 is associated with VPN_1. The customer edge router 104a may accordingly look up the address 10.1.1.1:05 in the VRF table associated with VPN_1. In these and other embodiments, the customer edge router 104a may route the reverse NAT'ed data packet 506 based on the VRF table (e.g., may route the packet through Interface_1).

Figure 6:
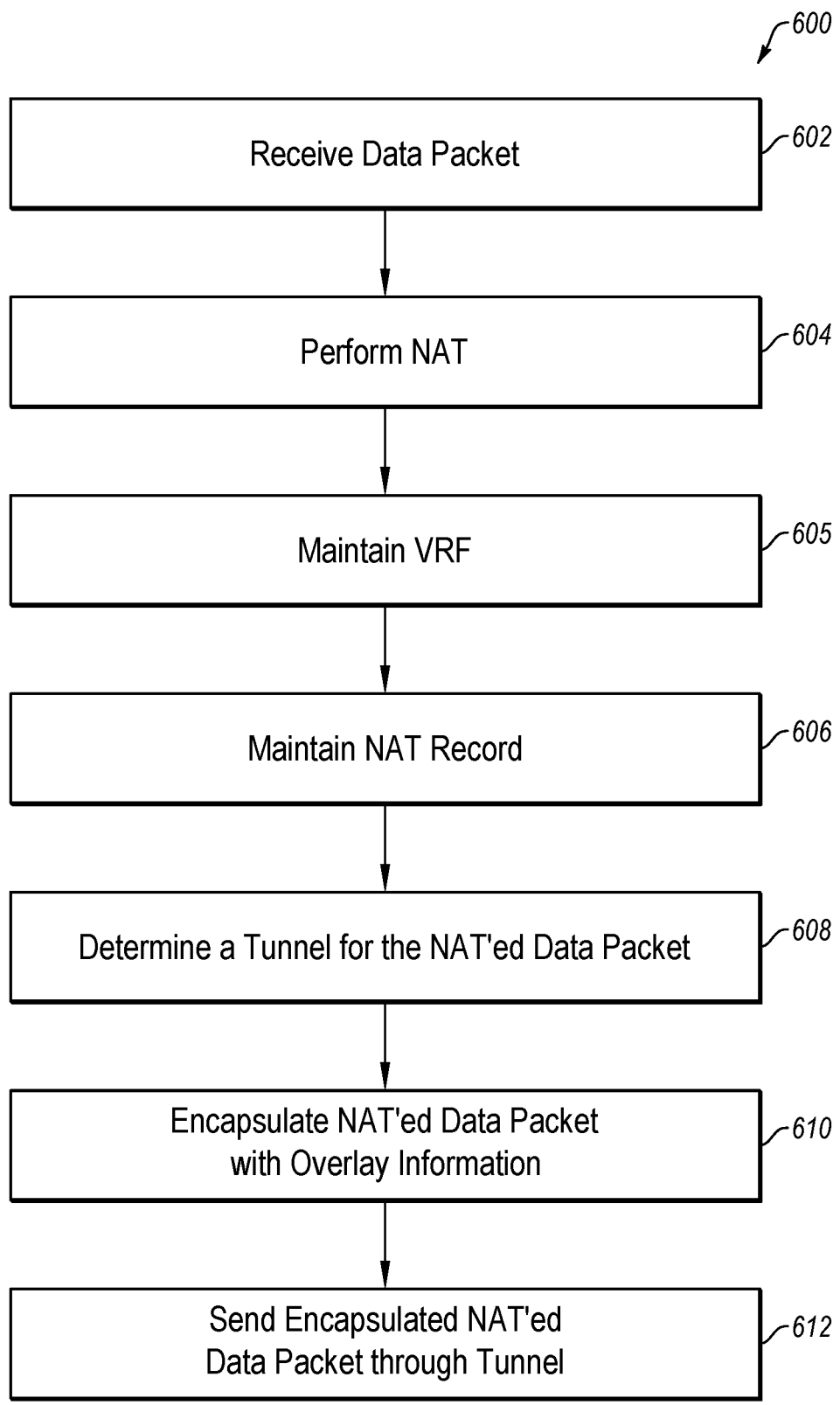
FIG. 6 is a flow diagram that illustrates an example process to transmit a data packet with NAT.

FIG. 6 is a flow diagram 600 that illustrates an example process to transmit a data packet with NAT, arranged in accordance with at least some embodiments described herein. Example processes and methods may include one or more operations, functions or actions as illustrated by one or more of blocks 602, 604, 605, 606, 608, 610, and/or 610, and may in some embodiments be performed by network node such as an edge network device 802 of FIG. 8. The operations described in blocks 602-612 may also be stored as computer-executable instructions in a computer-readable medium such as a memory 814 and/or a data storage 816 of edge network device 802.

As depicted by flow diagram 600, the example process to transmit a data packet with NAT may begin with block 602 ("Receive Data Packet"), where a network appliance, such as a customer edge router may receive a data packet to process. For example, the customer edge router may be located at an edge of a carrier network that is being managed by a carrier, and may be configured to provide NAT functionality. The customer edge router may be one of multiple devices that collectively provide a virtualized CGN domain in a network function layer.

Block 602 may be followed by block 604 ("Perform NAT"), where the customer edge router may perform NAT on the received data packet. For example, the customer edge router may translate the source IP address specified in the received data packet to its public IP address (e.g., the public IP address assigned to the customer edge router).

Block 604 may be followed by block 605 ("Maintain VRF"), where the customer edge router may maintain a record of the address mapping and/or routing within a particular VPN for the data packet. For example, if the data packet is received from a computing device within a given VPN, the address of the computing device may be entered in the VRF.

Block 605 may be followed by block 606 ("Maintain NAT Record"), where the customer edge router may maintain a record of the address translation (e.g., mapping) of the private IP address to the public IP address. For example, the customer edge router may maintain the record of the address translation a NAT table. As another example, the customer edge router may include the VPN to which the data packet belongs in the record of the address translation.

Block 606 may be followed by block 608 ("Determine a Tunnel for the NAT'ed Data Packet"), where the customer edge router may select an appropriate tunnel to forward the NAT'ed data packet. For example, the customer edge router may select an appropriate aggregation router to receive the NAT'ed data packet. The appropriate aggregation router may be an aggregation router in an aggregation platform layer that corresponds to the network function layer of the customer edge router. The customer edge router may have established respective tunnels to the aggregation routers in the corresponding aggregation platform layer.

Block 608 may be followed by block 610 ("Encapsulate NAT'ed Data Packet with Overlay Information"), where the network node may encapsulate the NAT'ed data packet with the overlay information corresponding to the selected tunnel. The overlay information may include a port address of the customer edge router and a port address of the aggregation router used to establish the selected tunnel.

Block 610 may be followed by block 612 ("Send Encapsulated NAT'ed Data Packet through Tunnel"), where the customer edge router may send the encapsulated NAT'ed data packet through the selected tunnel. The aggregation router at the other end of the selected tunnel may remove the overlay information from the encapsulated NAT'ed data packet and forward the de-encapsulated NAT'ed data packet to the specified destination. The aggregation router may maintain a record of the route (e.g., tunnel) through which the encapsulated NAT'ed data packet is received. For example, the record may include the source IP address specified in the removed overlay information and the source IP address specified in the de-encapsulated NAT'ed data packet.

Those skilled in the art will appreciate that, for this and other processes and methods disclosed herein, the functions performed in the processes and methods may be implemented in differing order. Furthermore, the outlined actions and operations are only provided as examples, and some of the actions and operations may be optional, combined into fewer actions and operations, or expanded into additional actions and operations without detracting from the essence of the disclosed embodiments.

Figure 7:
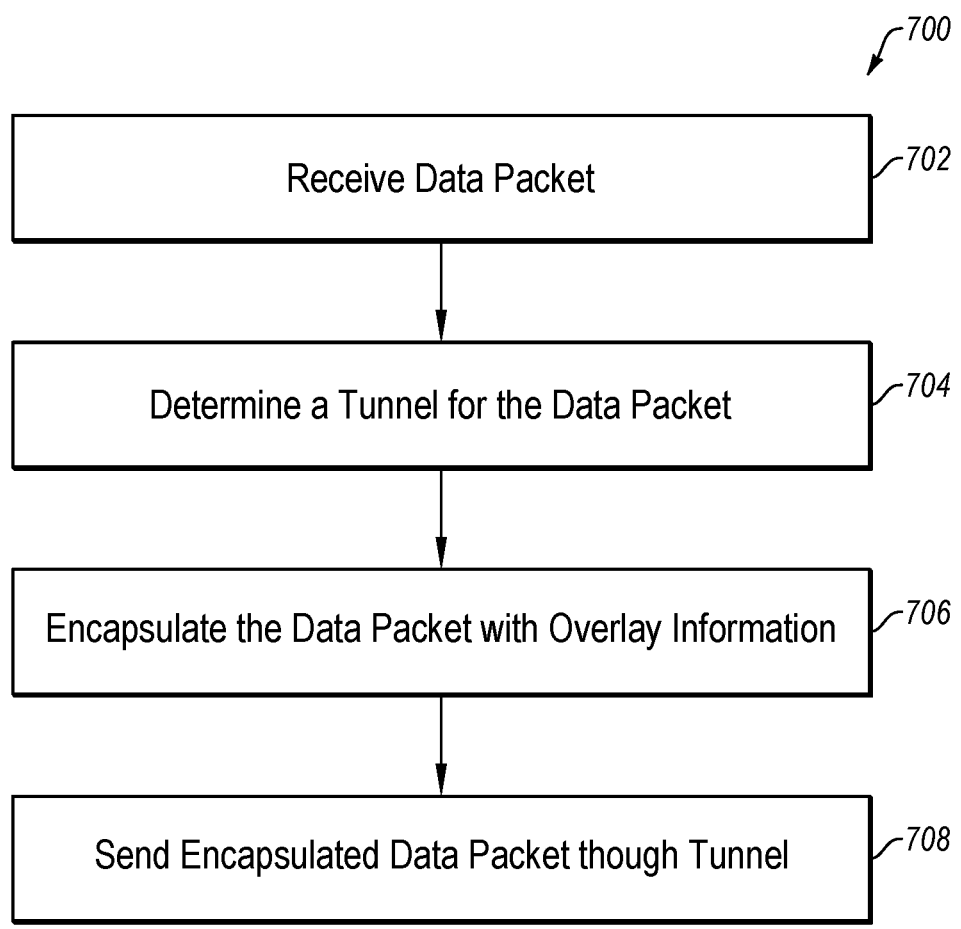
FIG. 7 is a flow diagram that illustrates an example process to transmit a return data packet corresponding to a NAT'ed data packet.

FIG. 7 is a flow diagram 700 that illustrates an example process to transmit a return data packet corresponding to a NAT'ed data packet, arranged in accordance with at least some embodiments described herein. Example processes and methods may include one or more operations, functions or actions as illustrated by one or more of blocks 702, 704, 706, and/or 708, and may in some embodiments be performed by network node such as an edge network device 802 of FIG. 8. The operations described in blocks 702-708 may also be stored as computer-executable instructions in a computer-readable medium such as a memory 814 and/or a data storage 816 of edge network device 802.

As depicted by flow diagram 700, the example process to transmit a return data packet corresponding to a NAT'ed data packet may begin with block 702 ("Receive Data Packet"), where a network appliance, such as an aggregation router may receive a data packet to process. For example, the aggregation router may be located at or near a public edge of a carrier network, and may be configured to direct network traffic to customer edge routers that may be providing a virtual CGN functionality. The aggregation router may be one of a number of devices in an aggregation platform layer. The aggregation router may determine from the destination IP address of the received data packet that the data packet is to be forwarded to a customer edge router in a function endpoint layer that corresponds to the aggregation platform layer.

Block 702 may be followed by block 704 ("Determine a Tunnel for the Data Packet"), where the aggregation router may identify a tunnel through which to forward the data packet to an appropriate customer edge router. For example, the aggregation router may identify the tunnel based on the destination IP address specified in the received data packet and its routing table. The aggregation router may be maintaining a routing table whose entries identify the tunnel through which NAT'ed data packets are received from the function endpoint layer.

Block 704 may be followed by block 706 ("Encapsulate the Data Packet with Overlay Information"), where the aggregation router may encapsulate the data packet with overlay information that corresponds to the identified tunnel. The overlay information may include a port address of the aggregation router and a port address of the customer edge router used to establish the identified tunnel.

Block 706 may be followed by block 708 ("Send Encapsulated Data Packet through Tunnel"), where the aggregation router may send the encapsulated data packet through the identified tunnel. The customer edge router at the other end of the identified tunnel may remove the overlay information from the encapsulated data packet. The customer edge router may determine to perform a reverse NAT on the de-encapsulated data packet. For example, the customer edge router may determine that the destination IP address specified in the de-encapsulated data packet is its device address (e.g., the public device address of the customer edge router), and determine from this to perform a reverse NAT to correctly forward the de-encapsulated data packet to the proper destination. The customer edge router may identify the correct destination IP address (e.g., the private IP address) from its NAT table, and reverse NAT the destination IP address specified in the de-encapsulated data packet to create a reverse NAT'ed data packet. The customer edge router may be maintaining a NAT table whose entries identify the mappings of the translations from a private IP address to its device address (e.g., the public IP address of the customer edge router). The customer edge router may forward the reverse NAT'ed data packet on its way to the destination address specified in reverse NAT'ed data packet.

Additionally or alternatively, the customer edge router may identify a VPN associated with the return data packet and may perform a lookup in the VRF table for the VPN to determine where the return data packet is to be routed.

Figure 8:
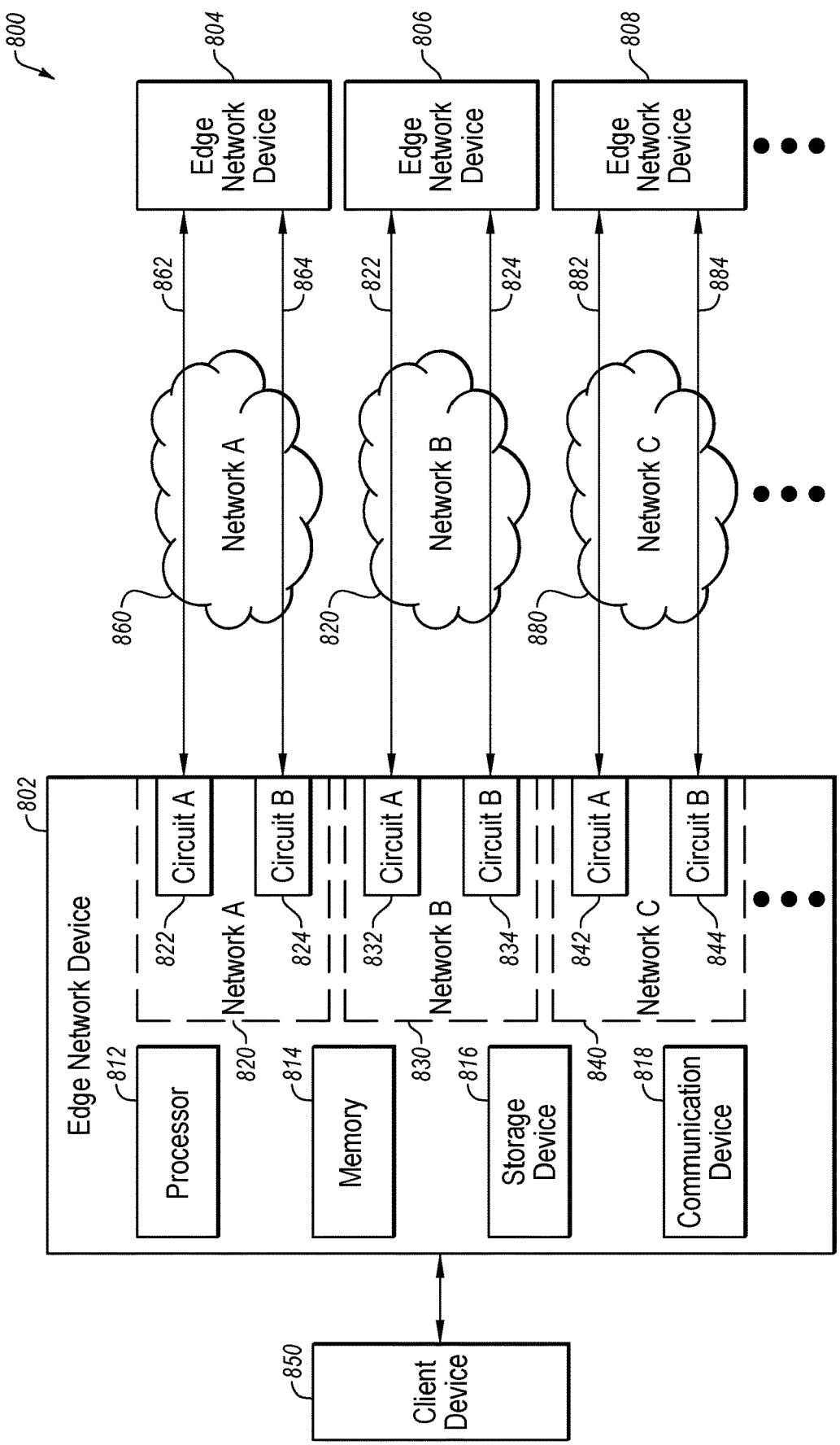
FIG. 8 illustrates an environment of an edge network device that may be used to provide a virtualized network function through address space aggregation, all arranged in accordance with at least some embodiments described herein.

FIG. 8 illustrates an environment 800 of edge network device 802 that may be used to provide a virtualized network function through address space aggregation, arranged in accordance with at least some embodiments described herein. As depicted, edge network device 802 that may include multiple potential connections for communicating with other edge network devices 804, 806, and 808. For example, edge network device 802 may communicate with edge network device 804 using a network A 860, with edge network device 806 using a network B 870, and/or with edge network device 808 using a network C 880. Edge network devices 802, 804, 806, and 808 may be similar or comparable to aggregation routers 102a and 102b and customer edge routers 104a, 104b, 106a, and 106b of FIGS. 1-5. Environment 800 may additionally include a client device 850 that may be communicatively coupled to edge network device 802, for example, across an external network domain.

In some embodiments, edge network device 802 may include a network A connection 820, a network B connection 830, and a network C connection 840. As illustrated by the ellipses below network C connection 840, any number of additional or other potential connections may also be included. In these and other embodiments, edge network device 802 may include multiple circuits for connecting to the one or more potential connections. For example, edge network device 802 may include a circuit A 822 and a circuit B 824 for network A connection 820, a circuit A 832 and a circuit B 834 for network B connection 830, and a circuit A 842 and a circuit B 844 for network C connection 840. In these and other embodiments, edge network device 802 may be configured to route traffic along one or more of the circuits, based on one or more policies stored by edge network device 802.

In some embodiments, edge network device 802 may be configured to monitor one or more properties of the various connections. For example, edge network device 802 may monitor the jitter, latency, loss, and/or bandwidth of the various communication links from edge network device 802 to edge network device 804, 806, and/or 808. In these and other embodiments, edge network device 802 may also monitor and/or store security properties of the various communication links. For example, links 862 and 864 over network A 860 may be considered at a first level of security, links 872 and 874 over network B 870 may be considered at a second level of security, and links 882 and 884 over network C 880 may be considered at a third level of security. In some embodiments, one or more of links 862, 864, 872, 874, 882, and/or 884 may be tunnels, such as GRE tunnels, IPsec tunnels, L2TP tunnels, and/or others.

In some embodiments, edge network device 802 may be configured to route traffic to the various links based on the source of the traffic. For example, one or more policies may indicate that traffic from one corporate department of a business be routed along network B connection 830, while traffic for another corporate department may be routed along any link.

In some embodiments, edge network device 802 may include a processor 812, a memory 814, a storage device 816, and/or a communication device 818. Generally, processor 812 may include any suitable special-purpose or general-purpose computer, computing entity, or processing device including various computer hardware or software modules, and may be configured to execute instructions stored on any applicable computer-readable storage media. For example, processor 812 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that processor 812 may include any number of processors distributed across any number of network or physical locations that are configured to perform individually or collectively any number of operations described in the present disclosure. In some embodiments, processor 812 may interpret and/or execute program instructions and/or process data stored in memory 814, storage device 816, or memory 814 and storage device 816. In some embodiments, processor 812 may fetch program instructions from data storage 816 and load the program instructions into memory 814. After the program instructions are loaded into memory 814, processor 812 may execute the program instructions.

Memory 814 and storage device 816 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 812. In some embodiments, edge network device 802 may or may not include either of memory 814 and storage device 816.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 812 to perform a certain operation or group of operations.

Communication device 818 may include any component, device, system, or combination thereof that is configured to transmit or receive information. In some embodiments, communication device 818 may communicate with other devices at other locations, the same location, or even other components within the same system. For example, communication device 818 may include a modem, a network card (wireless or wired), an optical communication device, a radio frequency transducer, an ultrasonic transducer, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like, and/or combinations thereof. Communication device 818 may permit data to be exchanged with a network and/or any other devices or systems described in the present disclosure. For example, communication device 818 may allow edge network device 802 to communicate with other systems, such as any one or more of edge network devices 804, 806, and 808.

Modifications, additions, or omissions may be made to environment 800 of FIG. 8 without departing from the scope of the present disclosure. For example, while illustrated as including a certain number of edge network devices 802, 804, 806, and 808, environment 800 may include any number of edge network devices. As another example, while illustrated as including three communication networks (network A 860, network B 870, and network C 880) any number of communication networks may be utilized.

As indicated above, the embodiments described in the present disclosure may include the use of a special purpose or general purpose computer (e.g., processor 812 of FIG. 8) including various computer hardware or software modules, as discussed in greater detail herein. Further, as indicated above, embodiments described in the present disclosure may be implemented using computer-readable media (e.g., memory 814 of FIG. 8) for carrying or having computer-executable instructions or data structures stored thereon.

According to some examples, methods to provide a virtualized Carrier-grade Network Address Translation (CGN) at a customer edge router of multiple customer edge routers are described. An example method to provide a virtualized CGN at a first customer edge router of multiple customer edge routers may include establishing, by the first customer edge router, a tunnel between the first customer edge router and each aggregation router among one or more aggregation routers; performing, by the first customer edge router, a Network Address Translation (NAT) on a first data packet to create a NAT'ed first data packet, the NAT being a translation of a private IP address to a public IP address; selecting, by the first customer edge router, a first aggregation router from amongst the one or more aggregation routers to send the NAT'ed first data packet to; encapsulating, by the first customer edge router, the NAT'ed first data packet with overlay information corresponding to a tunnel established between the first customer edge router and the first aggregation router; and sending, by the first customer edge router, the encapsulated NAT'ed first data packet through the tunnel to the first aggregation router. In some examples, the public IP address may be a device address of the first customer edge router. In other examples, the device address may be an individual IP address in a functional IP address space of the first aggregation router.

According to further examples, the first customer edge router and the first aggregation router may be provided by a first carrier, and the tunnel between the first customer edge router and the first aggregation router may be established using a network circuit provided by the first carrier. In some examples, the first customer edge router and the first aggregation router may be provided by a first carrier, and the tunnel between the first customer edge router and the first aggregation router may be established using a network circuit provided by a second carrier. In other examples, the method may also include maintaining, by the first customer edge router, a record of the NAT from the private IP address to the public IP address. In further examples, the overlay information may include an overlay header, the overlay header including a port address of the first customer edge router and a port address of the first aggregation router used to establish the tunnel between the first customer edge router and the first aggregation router.

According to other examples, the method may also include receiving, by the first customer edge router, a second data packet through the tunnel established between the first customer edge router and the first aggregation router; removing, by the first customer edge router, overlay information from the second data packet to create a de-encapsulated second data packet; performing, by the first customer edge router, a reverse NAT on the de-encapsulated second data packet; and forwarding the reverse NAT'ed de-encapsulated second data packet for delivery to a destination address specified in the reverse NAT'ed de-encapsulated second data packet.

According to other examples, customer edge routers configured to provide a virtualized CGN are described. An example customer edge router may include a memory configured to store instructions and a processor configured to execute the instructions. Execution of the instructions may cause the processor to establish an overlay network between the customer edge router and one or more aggregation routers, the overlay network including a respective tunnel between the customer edge router and each of the one or more aggregation routers; perform a Network Address Translation (NAT) on a first data packet to create a NAT'ed first data packet, the NAT being a translation of a private IP address to a public IP address; select an appropriate tunnel through which to send the NAT'ed first data packet; encapsulate the NAT'ed first data packet with overlay information corresponding to the selected tunnel; and send the encapsulated NAT'ed first data packet through the selected tunnel. In some examples, the public IP address may be a device address of the customer edge router. In other examples, the device address may be an individual IP address in a functional IP address space of the one or more aggregation routers.

According to some examples, the customer edge router and the one or more aggregation routers may be provided by a first carrier, and the respective tunnel between the customer edge router and each of the one or more aggregation routers may be established using a network circuit provided by the first carrier. According to other examples, the customer edge router and the one or more aggregation routers may be provided by a first carrier, and the respective tunnel between the customer edge router and each of the one or more aggregation routers may be established using a network circuit provided by a second carrier. According to further examples, the overlay information may include an overlay header, the overlay header including a port address of the customer edge router and a port address of an aggregation router with which the tunnel is established.

According to some examples, execution of the instructions may cause the processor to receive a second data packet through the selected tunnel; remove overlay information from the second data packet to create a de-encapsulated second data packet; perform a reverse NAT on the de-encapsulated second data packet; and forward the reverse NAT'ed de-encapsulated second data packet for delivery to a destination address specified in the reverse NAT'ed de-encapsulated second data packet.

According to other examples, non-transitory computer-readable storage media storing thereon instructions for execution by a processor of a customer edge router are described. An example non-transitory computer-readable storage media storing thereon instructions that, in response to execution by a processor of a customer edge router, may cause the processor to establish an overlay network between the customer edge router and one or more aggregation routers, the overlay network including a respective tunnel between the customer edge router and each of the one or more aggregation routers; perform a Network Address Translation (NAT) on a first data packet to create a NAT'ed first data packet, the NAT being a translation of a private IP address to a public IP address; select an appropriate tunnel through which to send the NAT'ed first data packet; encapsulate the NAT'ed first data packet with overlay information corresponding to the selected tunnel; and send the encapsulated NAT'ed first data packet through the selected tunnel. In further examples, the public IP address may be a device address of the customer edge router, the device address being an individual IP address in a functional IP address space of the one or more aggregation routers.

In some examples, the example non-transitory computer-readable storage media may also store thereon instructions that, in response to execution by the processor of the customer edge router, may cause the processor to receive a second data packet through the selected tunnel; remove overlay information from the second data packet to create a de-encapsulated second data packet; perform a reverse NAT on the de-encapsulated second data packet; and forward the reverse NAT'ed de-encapsulated second data packet for delivery to a destination address specified in the reverse NAT'ed de-encapsulated second data packet.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method to provide address translation at a first customer edge router, the first customer edge router being one of a plurality of customer edge routers, the method comprising:
   establishing, by the first customer edge router, a tunnel between the first customer edge router and each aggregation router among one or more aggregation routers;
   performing, by the first customer edge router, a Network Address Translation (NAT) on a first data packet to create a NAT'ed first data packet, the NAT being a translation of a private IP address to a public IP address;
   maintaining, by the first customer edge router, a Virtual Routing and Forwarding (VRF) record and a NAT record based on the NAT, the maintaining including creation of an entry in a NAT table identifying a virtual private network (VPN) to which the first data packet belongs;
   selecting, by the first customer edge router, a first aggregation router from amongst the one or more aggregation routers to send the NAT'ed first data packet to;
   encapsulating, by the first customer edge router, the NAT'ed first data packet with overlay information corresponding to the tunnel established between the first customer edge router and the first aggregation router to yield an encapsulated NAT'ed first data packet;
   sending, by the first customer edge router, the encapsulated NAT'ed first data packet through the tunnel to the first aggregation router,
   wherein,
      the first customer edge router and the first aggregation router are provided and managed by a first carrier network, and
      the tunnel between the first customer edge router and the first aggregation router is established using a network circuit provided and managed by a second carrier network.
2. The method of claim 1, wherein the public IP address is a device address of the first customer edge router.

3. The method of claim 2, wherein the device address is an individual IP address in a functional IP address space of the first aggregation router.

4. The method of claim 1, wherein the NAT record is of the private IP address to the public IP address.

5. The method of claim 1,
   wherein,
      the overlay information includes an overlay header,
      the overlay header includes a port address of the first customer edge router and another port address of the first aggregation router used to establish the tunnel between the first customer edge router and the first aggregation router.

6. The method of claim 1, further comprising:
   receiving, by the first customer edge router, a second data packet through the tunnel established between the first customer edge router and the first aggregation router;
   removing, by the first customer edge router, overlay information from the second data packet to create a de-encapsulated second data packet;
   performing, by the first customer edge router, a reverse NAT on the de-encapsulated second data packet to yield a reverse NAT'ed de-encapsulated second data packet; and
   forwarding the reverse NAT'ed de-encapsulated second data packet for delivery to a destination address specified in the reverse NAT'ed de-encapsulated second data packet.

7. The method of claim 1, wherein the maintaining of the NAT record includes maintaining a NAT table.

8. The method of claim 1, further comprising:
   terminating tunnels from an endpoint layer to form a gateway.

9. The method of claim 8, further comprising:
   advertising an aggregated IP space.

10. The method of claim 1, further comprising:
    receiving, by the first aggregation router, the encapsulated NAT'ed first data packet through the tunnel;
    removing, by the first aggregation router, the overlay information to yield a de-encapsulated NAT'ed packet; and
    maintaining, by the first aggregation router, a record of the tunnel through which the encapsulated NAT'ed first data packet was received without maintaining any NAT state information.

11. The method of claim 1,
    wherein,
       the first data packet is received from a computing device within the VPN, and
       the maintaining of the VRF record includes entering the address of the computing device in the VRF.

12. A customer edge router configured to provide address translation, the customer edge router being one of a plurality of customer edge routers, the customer edge router comprising:
    a memory configured to store instructions; and
    a processor configured to execute the instructions, wherein execution of the instructions causes the processor to:
       establish an overlay network between the customer edge router and one or more aggregation routers, the overlay network including a respective tunnel between the customer edge router and each of the one or more aggregation routers;

perform a Network Address Translation (NAT) on a first data packet to create a NAT'ed first data packet, the NAT being a translation of a private IP address to a public IP address;

maintain a Virtual Routing and Forwarding (VRF) record and a NAT record based on the NAT by creating an entry in a NAT table identifying a virtual private network (VPN) to which the first data packet belongs;

select an appropriate tunnel through which to send the NAT'ed first data packet;

encapsulate the NAT'ed first data packet with overlay information corresponding to the selected tunnel to yield an encapsulated NAT'ed first data packet; and send the encapsulated NAT'ed first data packet through the selected tunnel, wherein, the customer edge router and the one or more aggregation routers are provided and managed by a first carrier network, and the respective tunnel between the customer edge router and each of the one or more aggregation routers is established using a network circuit provided and managed by a second carrier network.

13. The customer edge router of claim 12, wherein the public IP address is a device address of the customer edge router.

14. The customer edge router of claim 13, wherein the device address is an individual IP address in a functional IP address space of the one or more aggregation routers.

15. The customer edge router of claim 12,
wherein,
the overlay information includes an overlay header, and
the overlay header includes a port address of the customer edge router and another port address of an aggregation router with which the tunnel is established.

16. The customer edge router of claim 12, wherein execution of the instructions causes the processor to:
receive a second data packet through the selected tunnel;
remove overlay information from the second data packet to create a de-encapsulated second data packet;
perform a reverse NAT on the de-encapsulated second data packet to yield a reverse NAT'ed de-encapsulated second data packet; and
forward the reverse NAT'ed de-encapsulated second data packet for delivery to a destination address specified in the reverse NAT'ed de-encapsulated second data packet.

17. A non-transitory computer-readable storage media storing thereon instructions that, in response to execution by a processor of a customer edge router, causes the processor to:

establish an overlay network between the customer edge router and one or more aggregation routers, the overlay network including a respective tunnel between the customer edge router and each of the one or more aggregation routers;

perform a Network Address Translation (NAT) on a first data packet to create a NAT'ed first data packet, the NAT being a translation of a private IP address to a public IP address;

maintain, by the customer edge router, a Virtual Routing and Forwarding (VRF) record and a NAT record based on the NAT by creating an entry in a NAT table identifying a virtual private network (VPN) to which the first data packet belongs;

select an appropriate tunnel through which to send the NAT'ed first data packet;

encapsulate the NAT'ed first data packet with overlay information corresponding to the selected tunnel to yield an encapsulated NAT'ed first data packet; and send the encapsulated NAT'ed first data packet through the selected tunnel, wherein, the customer edge router and the one or more aggregation routers are provided and managed by a first carrier network, and at least one tunnel of the respective tunnel between the customer edge router and each of the one or more aggregation routers is established using a network circuit provided and managed by a second carrier network.

18. The non-transitory computer-readable storage media of claim 17,
wherein,
the public IP address is a device address of the customer edge router,
the device address is an individual IP address in a functional IP address space of the one or more aggregation routers.

19. The non-transitory computer-readable storage media of claim 17, further storing thereon instructions that, in response to execution by the processor, causes the processor to:
receive a second data packet through the selected tunnel;
remove overlay information from the second data packet to create a de-encapsulated second data packet;
perform a reverse NAT on the de-encapsulated second data packet to yield a reverse NAT'ed de-encapsulated second data packet; and
forward the reverse NAT'ed de-encapsulated second data packet for delivery to a destination address specified in the reverse NAT'ed de-encapsulated second data packet.

\* \* \* \* \*